(12) United States Patent
Yang

(10) Patent No.: US 10,678,915 B2
(45) Date of Patent: Jun. 9, 2020

(54) METHOD, DEVICE AND PROGRAM FOR CHECKING AND KILLING A BACKDOOR FILE, AND READABLE MEDIUM

(71) Applicant: BEIJING QIHOO TECHNOLOGY COMPANY LIMITED, Beijing (CN)

(72) Inventor: Yi Yang, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 53 days.

(21) Appl. No.: 15/740,382

(22) PCT Filed: Dec. 12, 2016

(86) PCT No.: PCT/CN2016/109521
§ 371 (c)(1),
(2) Date: Dec. 28, 2017

(87) PCT Pub. No.: WO2017/101751
PCT Pub. Date: Jun. 22, 2017

(65) Prior Publication Data
US 2018/0330086 A1   Nov. 15, 2018

(30) Foreign Application Priority Data

Dec. 15, 2015   (CN) .......................... 2015 1 0933410

(51) Int. Cl.
*G06F 21/56*   (2013.01)
*G06F 21/55*   (2013.01)
*H04L 29/06*   (2006.01)

(52) U.S. Cl.
CPC .......... *G06F 21/563* (2013.01); *G06F 21/554* (2013.01); *G06F 21/56* (2013.01);
(Continued)

(58) Field of Classification Search
CPC .... G06F 21/563; G06F 21/554; G06F 21/568; H04L 63/1416; H04L 63/1433
See application file for complete search history.

(56) References Cited

U.S. PATENT DOCUMENTS

| | | | | |
|---|---|---|---|---|
| 8,176,554 B1 * | 5/2012 | Kennedy | ............... | H04L 63/145 726/23 |
| 8,990,944 B1 * | 3/2015 | Singh | ....................... | G06F 21/56 726/24 |
| 2014/0165203 A1 * | 6/2014 | Friedrichs | ............... | G06F 21/56 726/24 |

FOREIGN PATENT DOCUMENTS

| | | |
|---|---|---|
| CN | 102647421 A | 8/2012 |
| CN | 103632084 A | 3/2014 |

(Continued)

OTHER PUBLICATIONS

English Translation of ISR dated Feb. 15, 2017 From Corresponding PCT/CN2016/109521.
(Continued)

*Primary Examiner* — Hee K Song

(57) ABSTRACT

A method, device and program for checking and killing a backdoor file and a readable medium, wherein the method comprises: acquiring a historical deletion proportion of a target backdoor file, wherein the historical deletion proportion of the target backdoor file is a ratio of the number of deleting the target backdoor file to the number of symbolizing the target backdoor file as a suspect backdoor file in a preset time period; determining a checking and killing policy corresponding to the historical deletion proportion of the target backdoor file according to a predefined rule; and checking and killing the target backdoor file according to the checking and killing policy. Thus, more processing opinions (Continued)

are provided to the user for reference, so as to facilitate the user in rapidly and efficiently performing accurate processing of the file.

9 Claims, 3 Drawing Sheets

(52) U.S. Cl.
CPC ........ *G06F 21/568* (2013.01); *H04L 63/1416* (2013.01); *H04L 63/1433* (2013.01)

(56) References Cited

FOREIGN PATENT DOCUMENTS

| | | |
|---|---|---|
| CN | 103761478 A | 4/2014 |
| CN | 104765883 A | 7/2015 |
| CN | 105516151 A | 4/2016 |
| CN | 105553767 A | 5/2016 |

OTHER PUBLICATIONS

Written Opinion of ISR dated Feb. 15, 2017 From Corresponding PCT/CN2016/109521.

* cited by examiner

METHOD, DEVICE AND PROGRAM FOR CHECKING AND KILLING A BACKDOOR FILE, AND READABLE MEDIUM

CROSS REFERENCE TO RELATED APPLICATIONS

This application is a national stage application of International Application No. PCT/CN2016/109521 filed on Dec. 12, 2016 which based upon and claims priority to Chinese Patent Application No. 201510933410.6, filed in China on Dec. 15, 2015, the entire contents of which are incorporated herein by reference.

TECHNICAL FIELD

The present disclosure relates to the field of network security technology, and particularly to a method for checking and killing a backdoor file, a device for checking and killing a backdoor file, a program and a readable medium.

BACKGROUND

Website backdoor refers to a piece of webpage code, and mainly includes asp code and php code. The webpage code may be a separate file or may be a piece of code inserted into a normal file. An attacker may execute a series of dangerous operations on a server through a website backdoor file, including acquiring information in the server or further controlling the server.

In an existing solution for checking and killing the website backdoor on the market, a detection rule is written based on characteristics of a backdoor sample in most cases, to detect a website file, and recognize whether the website file includes malicious code. In a case that it is recognized that the website file includes malicious code, a prompt that the website file is a suspect malicious file is generated. The website file can be cleaned up if the website file is a separate file, and the website file cannot be cleaned up by a machine if the website file is a few sentences of malicious code inserted into a normal website file.

Therefore, the website file cannot be cleaned up readily using a tool for checking and killing backdoor on the market instead of by a user.

A flow of checking and killing backdoor in the existing host guard includes: filtering a file using a black list and a white list; scanning the file in a backdoor scanning engine; uploading a suspect file to the cloud to perform deep scanning; and reporting a scanned suspect backdoor file. The webmaster opens the file and determines whether to clean up the backdoor file.

The webmaster is difficult to determine whether the scanned suspect file is normal due to the lack of professional network security knowledge, therefore, the webmaster is unable to determine whether to delete the backdoor file or not. If the backdoor file is not deleted in time, the backdoor file is always a threat. A scanner on the market is used to match according to a simple rule, therefore, it is easy to generate false positive, that is, a normal file is determined as a suspect backdoor file, which increases processing difficulty of the webmaster.

SUMMARY

In view of the above problems, a method and a device for checking and killing a backdoor file is provided in the present disclosure, to overcome the above problems or at least partially solve the above problems.

A method for checking and killing a backdoor file is provided in an aspect of the present disclosure, which includes: acquiring a historical deletion proportion of the target backdoor file, where the historical deletion proportion of the target backdoor file is a ratio of the number of deleting the target backdoor file to the number of symbolizing the target backdoor file as a suspect backdoor file in a preset time period; determining a checking and killing policy corresponding to the historical deletion proportion of the target backdoor file according to a predefined rule; and checking and killing the target backdoor file according to the checking and killing policy.

A device for checking and killing a backdoor file is provided in another aspect of the present disclosure, which includes: one or more processors; and a memory; wherein one or more programs are stored in the memory, and when executed by the one or more processors, the one or more programs cause the device to: acquire a historical deletion proportion of a target backdoor file, wherein the historical deletion proportion of the target backdoor file is a ratio of the number of deleting the target backdoor file to the number of symbolizing the target backdoor file as a suspect backdoor file in a preset time period; determine a checking and killing policy corresponding to the historical deletion proportion of the target backdoor file according to a predefined rule; and check and kill the target backdoor file according to the checking and killing policy.

A program including readable code is further provided according to an embodiment of the present disclosure, a computing device executes the method for checking and killing the backdoor file according to any one of the embodiments of the present disclosure when the readable code is run on the computing device.

A readable medium is further provided according to the embodiments of the present disclosure, which stores the program described in the embodiment of the present disclosure.

It can be seen that, in the present disclosure, the historical deletion proportion of the target backdoor file is introduced, and different checking and killing policies are made with the historical deletion proportion as an influencing factor. In this way, a subsequent user can be guided with a processing policy for a suspect backdoor file by means of historical processing experience of the suspect backdoor file, thereby providing more processing advices for reference to the user for reference, and facilitating processing the suspect backdoor file accurately, rapidly and efficiently for the user. In the application of the present disclosure, a detection ratio of the backdoor file can be improved, and a one-click checking and killing ratio can be improved, also the webmaster can be helped to determine whether the target suspect backdoor file is a backdoor file based on the provided historical deletion proportion of the target backdoor file.

Only a brief of the technical solutions of the present disclosure is described above. In order to learn the technical means of the present disclosure more clearly and embody the technical means based on content of the specification, and to make the above and other objectives, features and advantages of the present disclosure more apparent and easier to be understood, the embodiments of the present disclosure are described below.

BRIEF DESCRIPTION OF THE DRAWINGS

By reading the detailed description of the preferred embodiments below, various other advantages and benefits become clear for those skilled in the art. The drawings are only used for showing the preferred embodiments and are not intended to limit the present disclosure. And in the whole drawings, same drawing reference signs are used for representing same components. In the drawings.

DETAILED DESCRIPTION

Figure 1:
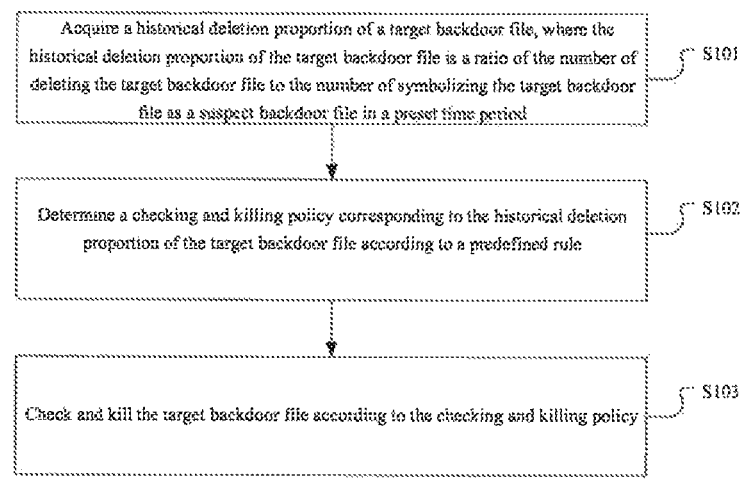
FIG. 1 is a flow chart of a method for checking and killing a backdoor file according to a first embodiment of the present disclosure.

Exemplary embodiments of the present disclosure are described in detail below with reference to the drawings. Although the exemplary embodiments of the present disclosure are shown in the drawings, it should be understood that the present disclosure may be implemented in various manners and are not limited to the embodiments described here. The embodiments are provided to understand the present disclosure more thoroughly and convey the scope of the present disclosure to those skilled in the art.

Reference is made to FIG. 1 which is a flow chart of a method for checking and killing a backdoor file according to a first embodiment of the present disclosure. The method includes steps S101 to S103.

In S101, a historical deletion proportion of a target backdoor file is acquired, where the historical deletion proportion of the target backdoor file is a ratio of the number of deleting the target backdoor file to the number of symbolizing the target backdoor file as a suspect backdoor file in a preset time.

The target backdoor file may include: a file which is determined as a suspect file in advance, that is, the file is suspected to be a backdoor file; and a file to be checked and killed (to be operated) with the method in the present disclosure. In actual implementation, a target backdoor file may be identified uniquely with a file identifier (for example, a md5 value).

Before determining the historical deletion proportion of the target backdoor file, the target backdoor file is determined first, that is, whether the file is a suspect backdoor file (a suspect malicious file) is determined in advance. Whether the file is a suspect backdoor file is determined in multiple manners. For example, the determination is performed in a manner of matching in a black list or a white list. For example, the file is determined to be a suspect backdoor file preliminarily if the file matches with a backdoor file in the black list. For example, the file is determined not to be a suspect backdoor file preliminarily if the file matches with a non-backdoor file in the white list. In addition, the determination may be performed in a manner of performing feature matching in a preset backdoor feature library, and the file is determined to be a suspect backdoor file preliminarily if the features match with each other. In addition, the determination may be performed in a manner of performing deep scanning on the file in the cloud or in a server, in this case, a detection algorithm or a scanning algorithm existing currently or in future may be adopted, the key is to match the file using a preset feature library, and determine whether the file is a suspect backdoor file.

After the file is determined to be the suspect backdoor file, that is, the target backdoor file is determined, acquiring a historical deletion proportion of the target backdoor file is needed. The historical deletion proportion of the target backdoor file is a ratio of the number of deleting the target backdoor file to the number of symbolizing the target backdoor file as a suspect backdoor file in a preset time period. For example, the target backdoor file is deleted 5 times in one month, and the number of symbolizing the target backdoor file as a suspect backdoor file is 100 times, the historical deletion proportion of the target backdoor file is 5/100=0.05.

The premise of acquiring the historical deletion proportion of the target backdoor file is to count once the target backdoor file is deleted and the target backdoor file is symbolized as a suspect backdoor file. Specifically, two counters may be provided: a deletion counter and a suspect symbolizing counter. A value of the deletion counter is increased by 1 once the target backdoor file is deleted. Similarly, a value of the suspect symbolizing counter is increased by 1 once the target backdoor file is symbolized as a suspect backdoor file. Therefore, the number of deleting the target backdoor file and the number of symbolizing the target backdoor file as a suspect backdoor file may be obtained by reading the value of the deletion counter and the value of the suspect symbolizing counter, and the historical deletion proportion of the target backdoor file is obtained by dividing the number of deleting the target backdoor file by the number of symbolizing the target backdoor file as the suspect backdoor file. In practice, the above implementation of the deletion counter and the suspect symbolizing counter are only exemplary, and are not limited to the above manners. The counter may be unnecessary, and a function of the counter may be realized in a software manner.

In addition, it should illustrated that the historical deletion proportion of the target backdoor file is changed dynamically, since the historical deletion proportion is changed once the target backdoor file is deleted or symbolized. Therefore, the historical deletion proportion acquired in step S101 described above may be understood as the latest value.

In S102, a checking and killing policy corresponding to the historical deletion proportion of the target backdoor file is determined according to a predefined rule.

In S103, the target backdoor file is checked and killed according to the checking and killing policy.

Specifically, different checking and killing policies may be set based on a value of the historical deletion number of the target backdoor file.

For example, a first predefined rule refers to adding the target backdoor file to a to-be-deleted backdoor list in a case that the historical deletion proportion of the target backdoor file is greater than a preset risk threshold, and a checking and killing policy corresponding to this case is to delete the target backdoor file in the to-be-deleted backdoor list. In this way, a probability of determining the target backdoor file as a backdoor file increases with the increase of the deletion proportion of the target backdoor file. In order to save time of the user (a webmaster) and improve efficiency, a checking and killing processing manner for the target backdoor file is obtained directed by using historical processing experience.

The risk threshold is set in advance, and may be adjusted dynamically. It can be understood that with the increase of the set risk threshold, a probability that the target backdoor file conforms to the first predefined rule reduces, that is, a probability of determining the target backdoor file as a backdoor file reduces, and a standard of determining the backdoor file is strict. In contrast, a probability of determining the target backdoor file as a backdoor file increases with the reduce of the set risk threshold. A reasonable scope of the risk threshold may be set and adjusted based on experience.

After it is determined that the historical deletion proportion of the target backdoor file is greater than the risk threshold, the target backdoor file is added to a to-be-deleted backdoor list, and a checking and killing policy corresponding to this case is to delete the target backdoor file in the to-be-deleted backdoor list. Such operation is simple and is not easy to miss killing a backdoor file, however, is easy to kill the target backdoor file by mistake, that is, the target backdoor file which is not a backdoor file is deleted. Therefore, in order to avoid from killing the target backdoor file by mistake, preferably, before the target backdoor file in the to-be-deleted backdoor list is deleted, the following steps are further executed: further determining whether the target backdoor file is a backdoor file; and only deleting the target backdoor file which is further determined as the backdoor file. Whether the target backdoor file is a backdoor file is further determined in multiple manners, such as a manner of matching the target backdoor file with a preset backdoor black list and/or a backdoor white list or a manner of performing feature scanning on the target backdoor file, or a manner of viewing the file by the webmaster. A result of determining whether the target backdoor file is a backdoor file by the webmaster is received.

Since the target backdoor file may be deleted according to the first predefined rule, the historical deletion proportion of the target backdoor file is updated after deleting the target backdoor file.

Further, a second predefined rule refers to displaying the historical deletion proportion of the target backdoor file in a case that the historical deletion proportion of the target backdoor file is greater than a preset safe threshold and is less than a preset risk threshold, and a checking and killing policy corresponding to this case is to display the historical deletion proportion of the target backdoor file for user's reference.

Wherein, the risk threshold and the safe threshold are set in advance, and may be adjusted dynamically. It can be understood that the risk threshold is greater than the safe threshold, and a probability that the target backdoor file conforms to the second predefined rule increases with the increase in a difference between the risk threshold and the safe threshold. A reasonable scope of the risk threshold is set and adjusted based on experience.

Further, a third predefined rule refers to adding the target backdoor file into a backdoor white list in a case that the historical deletion proportion of the target backdoor file is less than a preset safe threshold, and a checking and killing policy corresponding to this case is to add the target backdoor file into a backdoor white list.

Wherein, the safe threshold is set in advance and may be adjusted dynamically. It can be understood that with the increase of the set safe threshold, a probability that the target backdoor file conforms to the third predefined rule increases, that is, a probability of determining the target backdoor file as a non-backdoor file increases. In contrast, a probability of determining the target backdoor file as a non-backdoor file reduced with the reduce of the set safe threshold. A reasonable scope of the risk threshold may be set and adjusted based on experience.

After it is determined as above that the historical deletion proportion of the target backdoor file is less than the safe threshold, the target backdoor file is added into the backdoor white list. Such operation is simple and is not easy to kill a backdoor file by mistake, however, is easy to miss killing a backdoor file, that is, the backdoor file may be missed to be killed. Therefore, in order to avoid from missing killing a backdoor file, preferably, before the target backdoor file is added into the backdoor white list, the following steps are executed: further determining whether the target backdoor file is a non-backdoor file; only adding the target backdoor file which is further determined as the non-backdoor file into the backdoor white list. Wherein, whether the backdoor file is the non-backdoor file is determined in multiple manners, such as a manner of matching the target backdoor file with a preset backdoor black file and/or a preset backdoor white list, or a manner of performing feature scanning on the target backdoor file, or a manner of viewing the target backdoor file by a webmaster. A result of determining whether the target backdoor file is a non-backdoor file by the webmaster is received.

It can be seen that, in the present disclosure, the historical deletion proportion of the target backdoor file is introduced, and different checking and killing policies are made with the historical deletion proportion as an influencing factor. In this way, a subsequent user is guided with a processing policy for the suspect backdoor file by means of historical processing experience of the suspect backdoor file, thereby providing more processing advice reference to the user and facilitating processing the suspect backdoor file accurately, rapidly and efficiently for the user.

The above embodiments of the present disclosure may be applied into a scenario of a security application (App). For example, the 360 safeguard is used to calculate the number of deleting the target backdoor file, make a policy and execute the policy. For example, an example of the present disclosure includes: step 1, detecting based on a flow of checking and killing a backdoor file in conventional technology, and reporting a suspect backdoor file; step 2, determining whether the suspect backdoor file is a backdoor file and cleaning the suspect backdoor file by the webmaster in a case that the suspect backdoor file is the backdoor file, making a record once the backdoor file is cleaned and conveying the record to the 360 safeguard; step 3, calculating a proportion of deleting the backdoor file (identified uniquely with md5) by the webmaster based on deletion records conveyed in a time period by the 360 safeguard; step 4, by the 360 safeguard, viewing a file with a very low deletion proportion and determining whether the file is a normal file which is reported by mistake, and adding the file into a file white list in a case that the file is the normal file, and viewing a file with very high deletion proportion and determining whether the whole file is backdoor, and directly cleaning the file in a case that the whole file is the backdoor; step 5, displaying the deletion proportion in a result scanned by the webmaster, assisting the webmaster with determining whether the file is a backdoor file and whether to clean the file; and step 6, repeating steps 3 to 5 periodically, and updating the deletion proportion.

Figure 2:
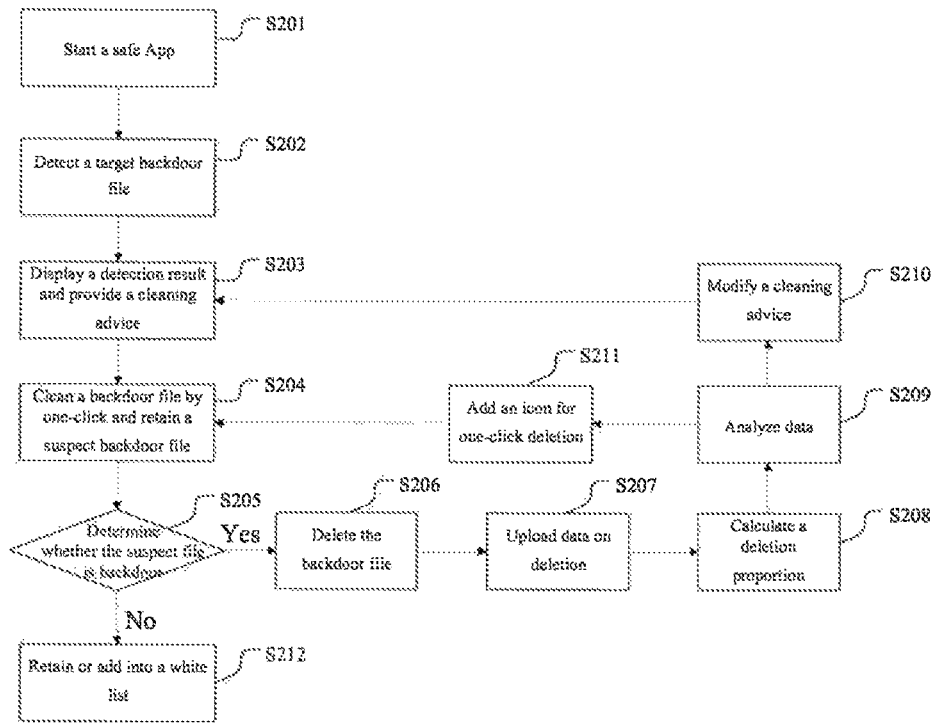
FIG. 2 is a flow chart of a method for checking and killing a backdoor file according to a second embodiment of the present disclosure.

With reference to FIG. 2 which shows a flow chart of a method for checking and killing a backdoor file according to a second embodiment of the present disclosure, which includes steps S201 to S211.

In step S201, a safe App is started by a user.

In step S202, the safe App detects a target backdoor file.

In step S203, a detection result is displayed, and a cleaning advice is provided.

In step S204, a backdoor file is one-click cleaned, and a suspect backdoor file is retained.

In step S205, whether the suspect backdoor file is a backdoor file is determined in a manner of viewing the suspect backdoor file by a webmaster and the like, and the method proceeds to S206 in a case that the suspect backdoor file is a backdoor file, and the method proceeds to S212 in a case that the suspect backdoor file is not a backdoor file.

In step S206, the backdoor file is deleted, for example, the backdoor file may be deleted by the webmaster.

In step S207, data on the deletion operation is uploaded.

In step S208, a deletion proportion of a backdoor file is calculated by the safe App.

In step S209, the deletion proportion is analyzed (the deletion proportion matches with a predefined rule) by the safe App.

In step S210, the cleaning advice is modified based on a policy matching with the deletion proportion, and the method proceeds to S203.

In step S211, a backdoor detection rule is adjusted, an icon for one-click deleting the backdoor file is added, and the method proceeds to S204.

In step S212, the file is retained or is added into a white list.

It can be seen that, with the solution according to the second embodiment, a detection ratio of the backdoor file can be improved, and an one-click checking and killing ratio can be improved, and the webmaster can be helped to determine whether the target suspect backdoor file is a backdoor file based on the provided historical deletion proportion of the backdoor file.

Figure 3:
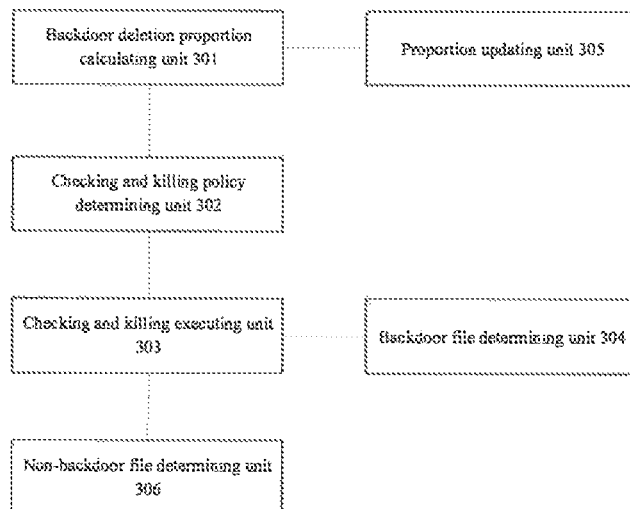
FIG. 3 is a schematic structural diagram of a device for checking and killing a backdoor file according to an embodiment of the present disclosure.

Corresponding to the above method, a device for detecting and killing a backdoor file is further provided in the present disclosure. The device may be implemented with hardware, software and a combination thereof. Preferably, the device refers to a safe App used for checking and killing backdoor. Reference is made to FIG. 3 which is a schematic structural diagram of an device for detecting and killing a backdoor file. The device includes a backdoor deletion proportion calculating unit 301, a checking and killing policy determining unit 302 and a checking and killing executing unit 303.

The backdoor deletion proportion calculating unit 301 is configured to calculate a historical deletion proportion of a target backdoor file. The historical deletion proportion of the target backdoor file is a ratio of the number of deleting the target backdoor file to the number of symbolizing the target backdoor file as a suspect backdoor file in a preset time period.

The checking and killing policy determining unit 302 is configured to determine a checking and killing policy corresponding to the historical deletion proportion of the target backdoor file according to a predefined rule.

The checking and killing executing unit 303 is configured to check and kill the target backdoor file according to the checking and killing policy.

Preferably, the predefined rule includes adding the target backdoor file into a to-be-deleted backdoor list in a case that the historical deletion proportion of the target backdoor file is greater than a preset risk threshold.

The checking and killing policy includes deleting the target backdoor file in the to-be-deleted backdoor list.

Preferably, the device further includes a backdoor file determining unit 304, which is configured to further determine whether the target backdoor file is a backdoor file by matching the target backdoor file with a preset backdoor black list and/or a preset backdoor white list and/or performing feature scanning on the target backdoor file, and/or receiving a result of determining whether the target backdoor file is a backdoor file by a webmaster.

The checking and killing executing unit 303 is configured to only delete the target backdoor file which is further determined as the backdoor file.

Preferably, the device further includes a proportion updating unit 305 configured to update the historical deletion proportion of the target backdoor file after the target backdoor file is deleted.

Preferably, the predefined rule includes displaying the historical deletion proportion of the target backdoor file in a case that the historical deletion proportion of the target backdoor file is greater than a preset safe threshold and less than a preset risk threshold.

The checking and killing policy includes displaying the historical deletion proportion of the target backdoor file.

Preferably, the predefined rule includes adding the target backdoor file into a backdoor white list in a case that the historical deletion proportion of the target backdoor file is less than a preset safe threshold.

The checking and killing policy includes adding the target backdoor file into the backdoor white list.

Preferably, the device further includes a non-backdoor file determining unit 306, which is configured to further determine whether the target backdoor file is a non-backdoor file by matching the target backdoor file with a preset backdoor black list and/or a backdoor white list, and/or performing feature scanning on the target backdoor file, and/or receiving a result of determining whether the target backdoor file is a backdoor file by a webmaster.

The checking and killing executing unit 303 is configured to add the target backdoor file which is further determined as the non-backdoor file into the backdoor white list.

As for the device embodiments, because they are similar basically to the method embodiments, the description thereof is simple relatively and similar content can be referred to the description of the method embodiments.

The algorithm and display provided here have no inherent relation with any specific computer, virtual system or other devices. Various general-purpose systems can be used together with the teaching based on this. According to the description above, the structure required to construct this kind of system is obvious. Besides, the disclosure is not directed at any specific programming language. It should be understood that various programming language can be used for achieving the content of the present disclosure described here, and above description of specific language is for disclosing the optimum embodiment of the present disclosure.

The description provided here explains plenty of details. However, it can be understood that the embodiments of the present disclosure can be implemented without these specific details. The known methods, structure and technology are not shown in detail in some embodiments, so as not to obscure the understanding of the description.

Similarly, it should be understood that in order to simplify the present disclosure and help to understand one or more of the various aspects of the present disclosure, the various features of the present disclosure are sometimes grouped into a single embodiment, drawing, or description thereof in the description of the exemplary embodiments of the present disclosure. However, the method disclosed should not be explained as reflecting the following intention: that is, the present disclosure sought for protection claims more features than the features clearly recorded in every claim. To be more precise, as is reflected in the following claims, the aspects of the disclosure are less than all the features of a single embodiment disclosed before. Therefore, the claims complying with a specific embodiment are explicitly incorporated into the specific embodiment thereby, wherein every claim itself serves as an independent embodiment of the present disclosure.

Those skilled in the art can understand that adaptive changes can be made to the modules of the devices in the embodiment and the modules can be installed in one or more devices different from the embodiment. The modules or units or elements in the embodiment can be combined into one module or unit or element, and furthermore, they can be separated into more sub-modules or sub-units or sub-elements. Except such features and/or process or that at least some in the unit are mutually exclusive, any combinations can be adopted to combine all the features disclosed by the description (including the attached claims, the abstract and the drawings) and any method or all process or units of the device disclosed as such. Unless there is otherwise explicit statement, every feature disclosed by the specification (including the attached claims, the abstract and the drawings) can be replaced by substitute feature providing the same, equivalent or similar purpose.

In addition, those skilled in the art can understand that although some embodiments described here comprise some features instead of other features included in other embodiments, the combination of features of different embodiments means falling into the scope of the present disclosure and forming different embodiments. For example, in the following claims, any one of the embodiments sought for protection can be used in various combination modes.

The various components embodiments of the present disclosure can be realized with hardware, or realized by software modules running on one or more processors, or realized by a combination thereof. Those skilled in the art should understand that microprocessor or digital signal processor (DSP) can be used for realizing some or all functions of some or all components of the device for checking and killing a backdoor file according to the embodiments in the present disclosure in practice. The present disclosure can also be implemented as one part of or all devices or device programs (for example, computer programs and computer program products) used for carrying out the method described here. Such programs for implementing the disclosure can be stored in a computer readable medium, or can possess one or more forms of signal. Such signals can be downloaded from the Internet web site or be provided at signal carriers, or be provided in any other forms.

Figure 4:
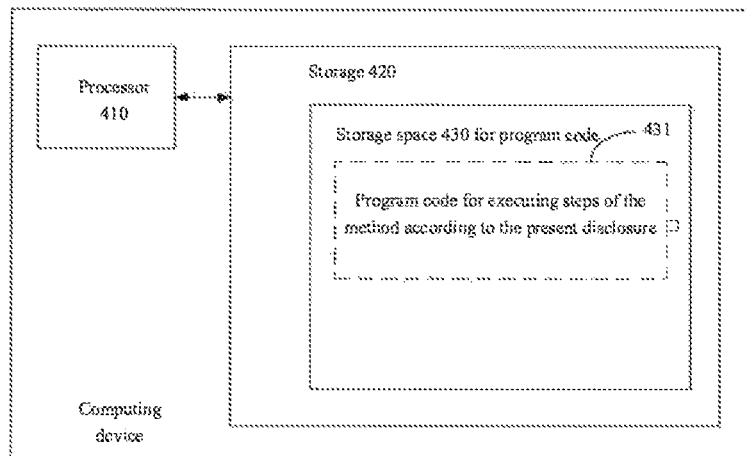
FIG. 4 is a block diagram of a computing device for executing a method for checking and killing a backdoor file according to the present disclosure.
Figure 5:
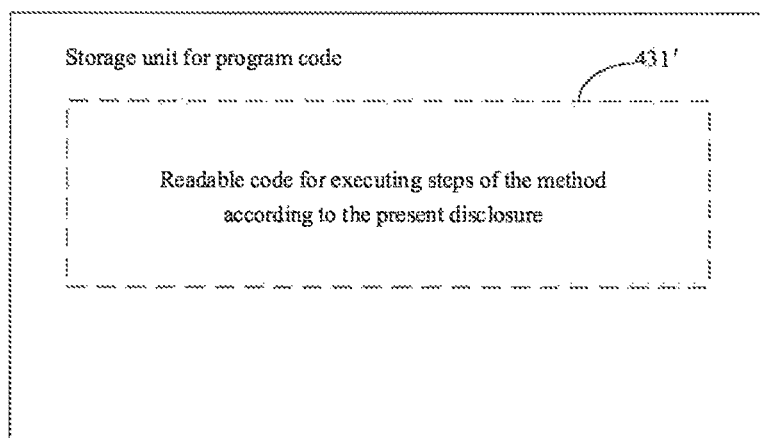
FIG. 5 shows a storage unit in which program code for implementing a method for checking and killing a backdoor file according to the present disclosure is kept or carried.

For example, FIG. 4 shows a computing device for implementing the method for checking and killing a backdoor file according to the present disclosure. The computing device traditionally comprises a processor 410 and a computer program product in the form of storage 420 or a computer readable medium. The storage 420 may be electronic storage such as flash memory, EEPROM (Electrically Erasable Programmable Read-Only Memory), EPROM or ROM, and the like. The storage 420 possesses storage space 430 for carrying out program code 431 of any steps of aforesaid method. For example, storage space 430 for program code can comprise various program codes 431 used for realizing any steps of aforesaid method. These program codes can be read out from one or more program products or written in one or more program products. The program products comprise program code carriers such as memory card. These program products usually are portable or fixed storage cell as said in FIG. 5. The storage cell can possess memory paragraph, storage space like the storage 420 in the computing device in FIG. 4. The program code can be compressed in, for example, a proper form. Generally, storage cell comprises readable code 431', i.e. the code can be read by processors such as 410 and the like. When the codes run on a computing device, the computing device will carry out various steps of the method described above.

It should be noticed that the embodiments are intended to illustrate the present disclosure and not limit the present disclosure, and those skilled in the art can design substitute embodiments without departing from the scope of the appended claims. In the claims, any reference marks between brackets should not be constructed as a limit for the claims. The word "comprise" does not exclude elements or steps that are not listed in the claims. The word "a" or "one" before the elements does not exclude that more such elements exist. The present disclosure can be realized by means of hardware comprising several different elements and by means of properly programmed computer. In the unit claims in which several apparatuses are listed, several of the apparatuses can be embodied by a same hardware item. The use of words first, second and third does not mean any sequence. These words can be explained as name.

Those skilled in the art can understand that all steps or a part of steps for realizing the above method embodiments can be implemented by programs instructing related hardware. The programs may be stored in computer readable medium such as ROM/RAM, a magnetic disk and an optical disc.

The objects, technical solutions and advantages of the present disclosure are further described in detail through the above embodiments. It should be understood that the above description is only the embodiments of the present disclosure and is not used to limit the protection scope of the present disclosure. Any modification, equivalent replacement, improvement and the like within the spirit and the principle of the present disclosure are contained within the protection scope of the present disclosure.

What is claimed is:

1. A method for checking and killing a backdoor file, comprising:
   acquiring a historical deletion proportion of a target backdoor file, wherein the historical deletion proportion of the target backdoor file is a ratio of the number of deleting the target backdoor file to the number of symbolizing the target backdoor file as a suspect backdoor file in a preset time period;
   adding the target backdoor file into a to-be-deleted backdoor list in a case that the historical deletion proportion of the target backdoor file is greater than a preset risk threshold, and deleting the target backdoor file in the to-be-deleted backdoor list;
   displaying the historical deletion proportion of the target backdoor file in a case that the historical deletion proportion of the target backdoor file is greater than a preset safe threshold and leas than a preset risk threshold;
   adding the target backdoor file into a backdoor white list in a case that the historical deletion proportion of the target backdoor file is less than a preset safe threshold.

2. The method according to claim 1, wherein before the deleting the target backdoor file in the to-be-deleted backdoor list, the method further comprises:
   determining further whether the target backdoor file is a backdoor file by matching the target backdoor file with a preset backdoor black list and/or a preset backdoor white list, and/or performing feature scanning on the target backdoor file, and/or receiving a result of determining whether the target backdoor file is a backdoor file by a webmaster; and deleting only the target backdoor file which is determined further as the backdoor file.

3. The method according to claim 1, further comprising:
updating the historical deletion proportion of the target backdoor file after deleting the target backdoor file.

4. The method according to claim 1, wherein before the adding the target backdoor file into the backdoor white list, the method further comprises:
determining further whether the target backdoor file is a non-backdoor file by matching the target backdoor file with a preset backdoor black list and/or a preset backdoor white list, and/or performing feature scanning on the target backdoor file, and/or receiving a result of determining whether the target backdoor file is a backdoor file by a webmaster; and adding only the target backdoor file which is determined further as the non-backdoor file into the backdoor white list.

5. A device for checking and killing a backdoor file, comprising:
one or more processors; and
a memory;
wherein one or more programs are stored in the memory, and when executed by the one or more processors, the one or more programs cause the device to:
acquire a historical deletion proportion of a target backdoor file, wherein the historical deletion proportion of the target backdoor file is a ratio of the number of deleting the target backdoor file to the number of symbolizing the target backdoor file as a suspect backdoor file in a preset time period;

add the target backdoor file into a to-be-deleted backdoor list in a case that the historical deletion proportion of the target backdoor file is greater than a preset risk threshold, and delete the target backdoor file in the to-be-deleted backdoor list;

display the historical deletion proportion of the target backdoor file in a case that the historical deletion proportion of the target backdoor file is greater than a preset safe threshold and less than a preset risk threshold;

add the target backdoor file into a backdoor white list in a case that the historical deletion proportion of the target backdoor file is less than a preset safe threshold.

6. The device according to claim 5, wherein the device are further caused to:
determine further whether the target backdoor file is a backdoor file by matching the target backdoor file with a preset backdoor black list and/or a preset backdoor white list, and/or performing feature scanning on the target backdoor file, and/or receiving a result of determining whether the target backdoor file is a backdoor file by a webmaster; and delete only the target backdoor file which is determined further as the backdoor file.

7. The device according to claim 5, wherein the one or more processors are further caused to:
update the historical deletion proportion of the target backdoor file after deleting the target backdoor file.

8. The device according to claim 5, wherein the device are further caused to:
determine further whether the target backdoor file is a non-backdoor file by matching the target backdoor file with a preset backdoor black list and/or a preset backdoor white list, and/or performing feature scanning on the target backdoor file, and/or receiving a result of determining whether the target backdoor file is a backdoor file by a webmaster; and add only the target backdoor file which is determined further as the non-backdoor file into the backdoor white list.

9. A non-transitory computer readable medium having computer programs stored thereon that, when executed by one or more processors of a computing device, cause the computing device to perform operations for checking and killing a backdoor file, the operations comprising:
acquiring a historical deletion proportion of a target backdoor file, wherein the historical deletion proportion of the target backdoor file is a ratio of the number of deleting the target backdoor file to the number of symbolizing the target backdoor file as a suspect backdoor file in a preset time period;

adding the target backdoor file into, a to-be-deleted backdoor list in a case that the historical deletion proportion of the target backdoor file is greater than a preset risk threshold, and deleting the target backdoor file in the to-be-deleted backdoor list;

displaying the historical deletion proportion of the target backdoor file in a case that the historical deletion proportion of the target backdoor file is greater than a preset sale threshold and less than a preset risk threshold;

adding the target backdoor file into a backdoor white list in a case that the historical deletion proportion of the target backdoor file is less than a preset safe threshold.

* * * * *